(12) United States Patent
Hockaday (10) Patent No.: US 11,891,320 B1
(45) Date of Patent: Feb. 6, 2024

(54) ADAPTIVE SOLAR HEATED ANAEROBIC DIGESTOR POND

(71) Applicant: Tucumcari Bio-Energy Corporation, Tucumcari, NM (US)

(72) Inventor: Robert G. Hockaday, Tucumcari, NM (US)

(73) Assignee: TUCUMCARI BIO-ENERGY CORPORATION, Tucumcari, NM (US)

( * ) Notice: Subject to any disclaimer, the term of this patent is extended or adjusted under 35 U.S.C. 154(b) by 13 days.

(21) Appl. No.: 17/526,077

(22) Filed: Nov. 15, 2021

Related U.S. Application Data (60) Provisional application No. 63/113,209, filed on Nov. 13, 2020.

(51) Int. Cl.
*C02F 3/28* (2023.01)
*C02F 11/04* (2006.01)

(52) U.S. Cl.
CPC ............ *C02F 3/2866* (2013.01); *C02F 11/04* (2013.01); *C02F 2203/006* (2013.01)

(58) Field of Classification Search
CPC ... C02F 3/2866; C02F 11/04; C02F 2203/006
USPC ............................................. 210/603, DIG. 9
See application file for complete search history.

(56) References Cited

U.S. PATENT DOCUMENTS

| | | | |
|---|---|---|---|
| 3,933,628 A | 1/1976 | Varani | |
| 4,091,800 A | 5/1978 | Fletcher | |
| 4,138,992 A | 2/1979 | Shaffer | |
| 4,221,571 A | 9/1980 | Rhoades | |
| 4,241,724 A | 12/1980 | Hull | |
| 4,796,404 A | 1/1989 | Butler | |
| 5,555,877 A | 9/1996 | Lockwood | |
| 9,902,638 B2 * | 2/2018 | Aho | ........................ B09B 1/004 |
| 2016/0251587 A1 | 9/2016 | Kennedy | |

FOREIGN PATENT DOCUMENTS

CA 2723974 A1 * 6/2011
WO 2014130042 A1 8/2014

* cited by examiner

*Primary Examiner* — Fred Prince
(74) *Attorney, Agent, or Firm* — Cermak Nakajima & McGowan LLP; James Creighton Wray (57) ABSTRACT

Large sealed anaerobic digestor ponds with thin rubber membrane covers to absorb sunlight efficiently in selective sunlight absorption coating and low emissivity in infrared and transparent insulation layers. Flow of pond byproduct gas and heat transfer to circulate slurry liquid controlled by pressurization and weighting of gas collection cover membrane to provide sloped buoyant bubble gas flow gas collection channels in deformed membrane. Low gas pressure used between layers to increase heat transfer to digesting slurry when low wind and prevent wind lift-off with high winds. High gas pressure used between membrane layers to remove sloped collection channels, permit thickened foam over digesting slurry and reduce heat transfer at night. These large-scale solar heating digesting ponds can maintain sufficient digestion temperature to accelerate digestion, maximize gas production efficiency, and minimize greenhouse gas emissions.

26 Claims, 8 Drawing Sheets

ADAPTIVE SOLAR HEATED ANAEROBIC DIGESTOR POND

This application claims the benefit of U.S. Provisional Application No. 63/113,209 filed Nov. 13, 2020, which is hereby incorporated by reference in its entirety as if fully set forth herein.

BACKGROUND OF THE INVENTION

Large scale anaerobic digestion and conversion of animal and food waste in large ponds and tanks produce useful methane, carbon dioxide, and plant available nutrient fertilizer. This digestion process occurs in a dark, oxygen deprived, wet environment with complex bacterial cultures without producing a significant amount of excess heat. By elevating and maintaining an environment in a temperature range from 35° C. to 70° C., where many anaerobic digestion bacterial cultures thrive, anaerobic digestion can process animal and food waste at a commercially viable rate. Slower digestion rates occurring with the mesophilic bacterial cultures at a 35° C. to 40.5° C. temperature range and more rapid digestion occurs in the thermophilic bacterial culture temperature range of 44° C. to 70° C. Raising the temperature of the digestion process has the advantage of speed and the elimination of pathogenic bacteria, fungi, seeds, and hormones at the higher thermophilic bacterial temperature range. While maintaining the higher processing temperature has more benefits it does require more initial heating and maintenance heating to counter the surface area heat losses from the large tanks and ponds to the environment. Conventional anaerobic digestors typically use natural gas or burn the product gas to heat the digestors. This gas combustion is a significant fraction of their entire energy output of the digestor system. Non-insulated digestor tanks can lose roughly over ⅓ of their effective system gas energy output as heating to maintain the temperature of the digestor tanks. The digestor system can be heated with solar energy to make the digestors efficient and reduce the greenhouse gas emissions impact of the digestors. It is estimated that in much of the southwest United States of America up to 75% of the year the insolation upon the digestor ponds alone could provide the heat energy needed to maintain the digestion ponds at 54° C. temperature with selective light absorption and low emissivity and convection preventing insulation. Natural solar salt ponds utilize density gradients to resist convective circulation. Circulation is required to achieve a uniform thermal distribution within a large solar pond for efficient digestion of food and animal wastes. Prior art digestor ponds and tanks are usually heated from the bottom of the pond to use natural convection or use forced circulation. At night pond and natural bodies of water can circulate by convention when the top surface is cooled by evaporation, convection, and radiation. With gas producing processes within the fluid of an anaerobic fluid slurry digestor in deep ponds and tanks the bubbling of product gas mixture of methane and carbon dioxide effectively can stir and also create circulation flows as the bubbles can rise through a vertical height in the slurry fluid. This bubble pump effect can be accentuated if a preferred flow is established such as in a convection cell. The gas bubbles pop or form a bubble foam on the top of the slurry fluid surface and the fluid can find a route back down toward the bottom of the tank or pond.

Large anaerobic digestor covered gas collection ponds are a cost-effective means of collecting methane and carbon dioxide from biomass of manure, paper waste, food waste, slaughter waste and plant material. They have significantly lower material and installation costs than concrete or steel tank digestors. For low cost economics these covered ponds have thin membrane liners and covers that are water and gas impermeable. A typical pond is scraped out of the earth with the pit and berms lined with bentonite clay as a secondary containment layer. For cost effective anaerobic digestor gas production performance the digestion process is usually enhanced by elevating the temperature of the digestion process in the range of 35° C. to 70° C. In sunny climates and warm areas of the earth, ponds could be effectively heated with solar energy and provide radiant and stagnant air or cell insulation with transparent membranes that have dead air volumes provided by inflation or bubbles within or around the membranes. These ponds can be over 100 meters by 100 meters in dimensions. At these size scales the mechanical strength of the EPDM (Ethylene Propylene Diene Monomer) rubber membranes (0.030 inch (0.76 mm) to 0.045 inches (1.27 mm)) thick would be at or exceed their maximum tensile strength to withstand Bernoulli effect wind lifting of the membranes in the United States at 90 mph. In most of the USA where most manure digestors are expected to be located, the roofing codes specify withstanding 90 mph although maximum wind speeds that can be encountered with hurricanes and tornados with wind speeds as high as 180 mph. Typical inflated EPDM membranes on a 100-meter width ponds would experience 3 times the maximum tensile strength and fail. This estimate did not address the bulging and rippling distortions on a large, inflated rubber cover membrane with wind gusts that could mechanically wear the membranes. The transparent plastic bubble covers made of UV resistant polyethylene would fail at 90 mph. (40 m/s). A solution is to reduce the gas pressure under the membranes or weight the membranes to counteract the lift of the wind.

Heat transfer from a solar heated ceiling top surface to the liquid in a covered pond of radiant, thermal conduction, and convection is expected. For a temperature difference between the cover and the liquid slurry of approximately 10° C., and still within the operating range of anaerobic digestors, only 10% of the insolation heat could be transferred by infrared radiation through the ceiling air gap. While approximately 90% could be transferred by convection into the pond slurry if it is in contact with the self-circulating slurry. Therefore, to enable effective solar heating of the pond self-circulating slurry without adding another heat transfer mechanism, such as a circulated fluid, the solar heated cover needs to be in contact with the slurry. Foaming from the gas bubbles that emerge at the surface of the slurry is an effect that often occurs in anaerobic digestors. Gas creation and bubble foams at the surface of the digestate slurry can lift membrane covers off the digestate slurry this foam can foul gas outlets and effectively create a foam gas cell insulating layer between the digestate slurry and the upper cover membrane. The foam can cover inlets and flow into the gas purification system. Foaming within the slurry can reduce the slurry density and increase the volume of the slurry leading to liquid slurry pushed into the gas outlet. A technique to reduce the foam is to spray the foam with jets with droplets to pierce and "pop" the foam bubbles and moving wires and screens to break the bubbles. A new technology that has emerged is to use porous hydrophobic tubing (PTFE) polytetrafluoroethylene to separate water and gas that could also be utilized to separate produced gas and slurry within confined spaces. The foaming and persistence foam of the anaerobic digestion slurry can increase when digesting materials are high in sugar, protein, acids, surfactants, and fats. Aged manure feed stocks will often generate more foam than fresh manures. The addition of sugars, proteins and fats typically will increase the production of fatty acids and carbon dioxide and methane output. This increases the bubbling rate from the slurry and increases the foaming and persistence of the foam. The sugar and proteins and fats will digest at thermophilic conditions within approximately 12 hours. Therefore, the foaming could be controlled with injections and digestion in the tanks completed with approximately 12-hour time periods.

PRIOR ART

James Fletcher et al. U.S. Pat. No. 4,091,800 Describes using transparent membrane covered and black polymer lined ponds. Uses a foam over the outer transparent layer to clean and insulate the transparent layer. Wind is used to push the bubble foam across the surface of the transparent layer. Uses tubing over the over the pond with fluid insulation layer. Also described using inflated stagnant air layers over the pond to insulate the pond. Holding down membranes on berms on perimeter of ponds is described. Blister pack membranes transparent membranes are described as covering the top of the pond. Siloons (plastic spheres) filled with air or water filled described. Utilizes a hydrogel coating that is a selective infrared blocking coating. Utilizes a UV like blocking material in the hydrogel coating to block UV light. Also uses glass beads in the polymer surface to act as selective light transmitters and infrared blockers. Generating bubbles in the ponds to create foams to cover the surface of liquid ponds as insulation and a cleaning agent to be blown by the wind across membrane surfaces. Fletcher does not describe using the bubbling to circulate the liquid water within the ponds or covering the bubble foams under a membrane. He does show an air-filled membrane coverer pond but does not describe using low gas pressures to hold down membranes or blister-pack membranes. He does not mention creating sloped surfaces under membranes for gas collection or convection flow. Fletcher does not describe using bubbling from digestion from within water of the pond. Fletcher does not describe creating or using foams under membrane covers.

Robert Butler U.S. Pat. No. 4,795,404 Describes light transmitting thermal barriers that use air fill bubbles in window applications. Butler does not teach inflating gaps between the plastic bubble layers to change insulation properties as needed. The window inserts described have rigid exteriors.

John Hull U.S. Pat. No. 4,241,724 Describes a method of preventing convection in a solar pond by using transparent layers of membranes of liquid and liquid filled capsules. Hull does not describe increasing convection heat transfer, bubble generation or flow or changing the insulation properties of the layers or heat loss rates to control temperature of the pond.

Nicholas Kennedy et al. US 2016/0251587 A1 Describes using bubbling Biogas from digestors to remove hydrogen sulfide from the gas in a reactor and the modes of bubbling for flow. But does not describe using the bubbling to circulate a slurry or using the bubbles for insulation.

Pierre Cote PCT/US2013/027411 teaches using microsieve technique for solid/liquid separations in anaerobic digestor. Described oxygen or air transported through a membrane into a liquid. Cote does not describe separating gas from slurry, foams, or liquid.

Lloyd Shaffer U.S. Pat. No. 4,138,992 Describes using cellular structures filled with fluid and raising the viscosity of fluids in the cellular structures to inhibit convection in solar ponds. Shaffer does not describe using fluid changing the insulating properties from day to night.

George Lockwood U.S. Pat. No. 5,555,877A teaches using low pressure to counter act the wind effects on swimming pool covers with center sheet vents with check valves to remove air under covers. Lockwood does not describe changing the slope or dimpling the cellular membrane with low pressure.

Varani, in U.S. Pat. No. 3,933,628 describes a solar heated anaerobic digestor which is solar heated. The digestor is buried in the ground and covered with a liquid filled pond. The liquid, being absorptive of solar energy, is circulated through the digestor to heat the contents through a heat exchanger in the digestor. A translucent roof, in the form of a dome or inflated bubble exterior of the pond, is used to establish a regulatory temperature environment of. The floating solar pond is separated from the digesting pond with a bottom cover membrane and supported with buoyant tubes and provides a biogas cavity above the digestate pond. Varani, does not show physical contact between the bottom of the solar pond membrane and digesting liquid and does not mention conduction or convection heat transfer by this route. Varani does not mention using selective solar light absorption and low emissivity coatings and describes evaporation of water from the solar pond to condense water on the inflated bubble. He does not mention using low pressure to hold down the inflated bubble in high winds. He does mention using the bubble circulation to mix the bacterial culture with 15-18% solids fraction in the digestor but not to do convective transfer heat from the bottom of the floating solar pond to the top surface or sides of the digestor pool. From our testing our upper limit of the solids fraction to get effective cattle manure circulation is 12%. He does not mention using bubble foam to insulate the digesting pond. He does not mention changing the buoyancy of the solar pond to change heat flow rates or adjusting the temperature in the digesting pond.

Don Rhoades U.S. Pat. No. 4,221,571 "Solar Heated Anaerobic Digestor" in Claim 1 teaches "removable panels of insulative materials enclosing the layer of heat absorptive material". Rhoades does not teach creating fluid insulative materials or using flows, weighting, shaping and pressures to remove or add the insulation. He does not place or anticipate placing the insulation under the heat absorptive material.

SUMMARY OF THE INVENTION

The essence of this invention is that heat can be efficiently transferred into a digestate pond using the self-circulation of the pond anaerobic bacteria digestion bubble production and rise up in the digestate slurry coupled with the digestate fluid slurry making contact with the upper cover membrane that has a selective light absorbing outer surface to absorb solar energy and a lower emissivity outer surface to reduce infrared emission heat loss. To enable the cover membrane to maintain good thermal contact with the slurry fluid, and prevent coalescence of bubbles separating the cover membrane from the slurry fluid, the cover needs to have a slope such that the bubbles are channeled to the collection points in the pond and the bubble flow under the surface of the cover membrane induces slurry flow. The slurry flow and contact with the solar heated cover membrane enables heat to be transferred into the entire slurry fluid in the pond. Negative atmospheric pressure collection of the gas and/or weighting or float points and/or lines in the cover membrane create the slopes and channels in the cover liner. Porous hydrophobic tubing and floats can be used to create float lines that enable sloped channels and can be used to filter the gas from the water and slurry. Weighting tubing across the surface of the cover membrane can shape the cover membrane to slope and channel the cover membrane to enable bubble rising driven fluid flow. Buoyant tubing under and across the surface of the cover membrane can shape the cover membrane to slope and channel the cover membrane to enable bubble rising and fluid flow. This fluid flow can be used to add or remove heat to the top membrane surface, and thereby add and remove heat from the slurry. The network of tubing crossing the pond cover surface is arranged to create a weight per unit area and channels on the cover membrane to increase the weight loading per unit area near the center of the cover membrane and less on the perimeter such that it creates a slope of the cover membrane to provide a buoyancy gradient and flow channels for the production gas bubble flow underneath the cover membrane. This tube network can be anchored to the perimeter of the covered pond berm.

In the evening when the heat losses exceed the insolation gain, the thermal insulation of the solar heated ponds can be increased by raising the gas pressure between the cover membrane and the slurry and removing water from the weighting tubes and/or bladders. This will allow the cover membrane to flatten and form a cavity between the slurry surface. Permitting a bubble foam layer on the surface of the slurry to form and persist from the bubbling of the mixture of carbon dioxide and methane gas from the anaerobic digestion within the slurry. Injections of cheese whey waste or other sugar, protein, fats or acid into the slurry could be calculated based on weather conditions and a timed to be injected to anticipate the loss of insolation and benefit of increasing the thermal insulation, thus generating a higher rate of gas production with anaerobic digestion and more persistent foam just as the need for thermal insulation occurs. On the following day when sunlight heats the membrane cover the foaming layer can be pushed out of the slurry-to-membrane space. A sloped and shaped membrane surface can be formed by increasing the non-uniform weighting or buoyancy of the cover to form channels in the cover membrane using the weight and position of water flow tubing and/or bladders in contact with the membrane cover and by reducing the gas pressure under the membrane cover. This allows for heating the gas membrane to transfer heat into the slurry when there is sufficient insolation and insulates the slurry at night to retain heat gained by solar insolation.

Transparent bubble wrap or inflated membrane covers with fluid controls rather than mechanical insulation adjustments insulates the ponds by letting sunlight heat the cover membrane at lower cost. By being able to use sub-atmospheric pressures to collect the production gas from under the cover membrane and the bubble wrap membrane the pond can quickly evacuate gases with pumps to prevent the membrane from being lifted off by wind. By monitoring the weather and adapting the membrane covers to withstand wind forces, optimize heat gain, or heat loss, the suitable slurry digestion temperatures can be maintained in the pond. The gas collection pressure can be increased at night if there is low wind permitting an increased gas gap between the cover membrane and the slurry surface, reducing heat loss from the slurry. The gas collection pressure can be occasionally increased to lift up the cover membranes to enable rainwater to flow off the cover membranes, clean off dirt, and find or mitigate gas leaks.

A mobile bottom drain entrance connected to a floating flexible drain tube placed on the bottom of the pond to hover over the liner membrane surface with liquid slurry jets move and suck in slurry from the bottom of the pond. With hydraulic or electronic controls, it would enable the bottom drain to scour the bottom of the pond for sediment deposits without damaging the rubber bottom membrane. The slurry sucked from the bottom of the pond would be pumped out of the pond or flowed through heat exchangers and jets to burst foam bubbles in the gas collection cavities on the perimeter and entrance slurry flow for downward circulation in the pond.

These and further and other objects and features of the invention are apparent in the disclosure, which includes the above and ongoing written specification, with the claims and the drawings.

FIGURE COMPONENT NUMBER DESCRIPTION LIST

FIGS. 1-4
1. Gas removal pipe
2. Slurry entrance
3. Weighting water tube
4. Perimeter weight clamp
5. Biogas
6. Foam
7. Gas/water separation hydrophobic filter
8. Bubble wrap insulation or membrane layers
9. Air or inert gas gap between the bubble wrap and cover membrane
10. Weighting tubing and center weight or bladder
11. Selective light absorption and emitter coating or layer
12. Rubber layer membrane
13. Foam
14. Perimeter weight clamp
15. Air or inert gas inflation or deflation supply tube
16. Weighting and heat transfer water fill or empty tubes
17. Rubber closed cell foam seals
18. Slurry exit tube
19. Bentonite clay layer
20. Rubber membrane liner
21. Digesting manure slurry
22. Soil shaped into depression and embankments 23. Agitator pump entrance or bottom suction entrance and tube
24. Anaerobic bacteria produced methane and carbon dioxide gas bubbles
25. Methane Gas bubbles flowing on underside of cover membrane
26. Water droplets
27. Slurry spray nozzle or fans.
28. Gas in weight water tube and bladder
29. Sky and atmosphere

FIG. 5

35. Exterior soil slope of berm
36. Rubber liner on top edge of berm
37. Rubber liner on inner slope of berm
38. Rubber lined bottom of pond.
39. Hydraulically actuated bottom mobile intake
40. Flexible rubber hose with input low solids digestate water
41. Flexible rubber hose output with high solids slurry water
42. Low Solids digestate water out.
43. Centrifuge and pump
44. Concentrated digestate solids output
45. Slurry re-circulation flow
46. Cold water output of heat exchanger
47. Re-circulation slurry water flow in heat exchanger
48. Hot water input to heat exchanger
49. Pressure pump to low solids digestate water
50. Input flow from first stage digestors of mixers
51. Gas output from gas collector filter
52. Circulation slurry flow nozzle
53. Droplet spray nozzles
54. Hydrophobic gas/water filter collector.

FIG. 6

60. Weighting and heat transfer tube fluid flow network and electrical sensors
61. Outflow of the fluid flow network and electrical sensors
62. Rubber tube holder and fluid bladder and electrical sensors
63. Inlet flow for the fluid flow network and electrical sensors
64. Rubber cover membrane with selective spectral absorption and emission coating
65. Inflation and deflation gas input
66. Inflation and deflation gas output

FIG. 7

70. Perimeter weighting clamp
71. Cellular transparent membrane

FIG. 8

80. Combustion exhaust
81. Boiler
82. Boiler heat exchange cold water in
83. Boiler Heat exchange hot water out
84. Hot or cold water input to heat exchanger
85. Hot slurry water out
86. Counter flow heat exchanger
87. Cold water out
88. Cold slurry in
89. Water recirculation pump
90. Flow route to weighting tubes
91. Gas vent valve
92. Valve on weighting tube network
93. Pump on weighting tube network
94. Centrifuge on slurry
95. High solids slurry out
96. Digestate low solids liquid out
97. Pump on digestate low solids liquid out
98. Hydraulic actuated drain
99. Spray jets
100. Slurry Pool
101. Weighting tubes on membrane cover
102. Air/gas vent valve or vacuum pump on cellular membrane cover
103. Release valve on digestate low solid liquid to fertilize farms
104. Bin or truck bin for delivery of solid digestate to farms or fertilizer manufacturer
105. Bio-Gas collection volume between slurry and cover
106. Valve on biogas collection pipe
107. Compressor on bio gas collection pipe to gas purifier and boiler
108. Pipeline of Biogas to boiler burner
109. Valve on biogas to boiler pipe
110. Valve on air/gas pipe to cellular membrane cavity
111. Valve on air/gas pipe to purge liquid from weighting liquid network
112. Air/gas compressor
113. Valve on slurry input pipe
114. Slurry input to solar pond digestor
115. Air input to boiler
116. Cellular membrane cavity
117. Slurry circulation pump
118. Dry air flow in
119. Chilled water out
120. Evaporation of water into air flow on tray
121. Moist air exit
122. Warm water input
123. Chiller bypass valve and route
124. Boiler bypass valve and route
125. Liner membrane
126. Liquid gas surface of slurry
127. Cover membrane
128. Weighting tube
129. Cellular membrane

DETAILED DESCRIPTION

Figure 1:
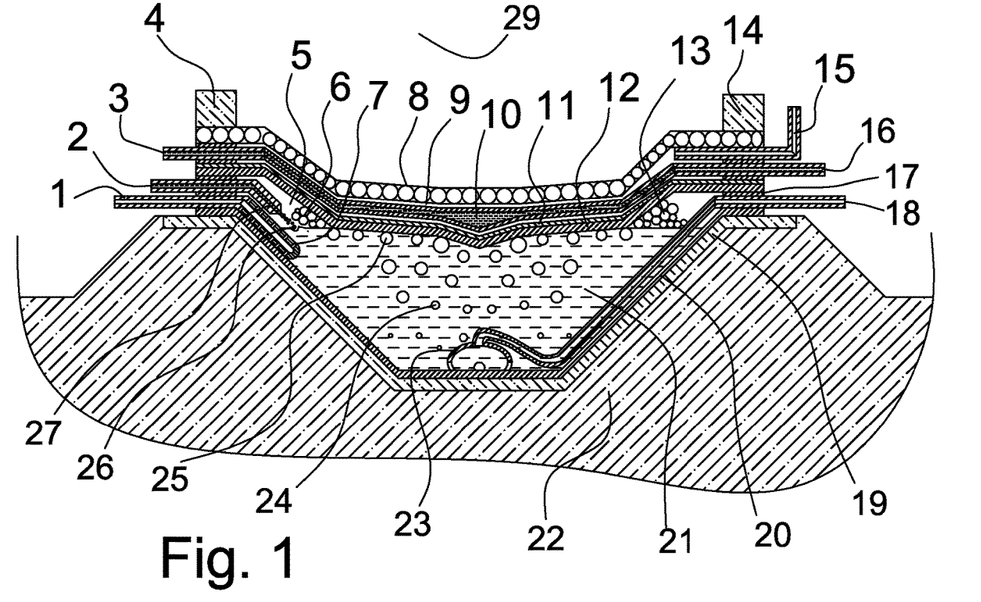
FIG. 1 is a cross-sectional view of covered solar digestion pond in negative pressure gas collection and cellular membrane layer mode.

In FIG. 1 a cross-sectional view of a solar heated digestor pond is shown. The pond is created by digging and scraping soil and rock into a basin with berms on the perimeter 22. A typical holding pond can range in size from 10 m to 1000 m in dimensions and depths of 1 m to 20 m. Large rocks, trees, roots and sharp objects are removed from the surface of the basin 22. This shaped basin has a layer of bentonite clay 19 over the interior and crest of the berm. The clay layer acts as a secondary containment and soft conforming layer to the membrane liner. A lining membrane layer made of 0.030 inch to 0.045 inch thickness of EPDM (Ethylene Propylene Diene Monomer (manufactured by Agru America Inc. 500 Garrison Road, Georgetown, SC 29440) rubber membrane 20 is placed over the clay surface 19. The rubber membrane is thermally or chemically welded to form a continuous watertight surface shape over the basin to the edges of the berm. A traveling drain is placed at the bottom of the basin 23. This drain system can be an electrically powered submersible pump or hydraulically actuated hovering drain that has the function of removing slurry from the bottom of the pond through a pump and/or centrifuge and delivered as solid digestate, low solids liquid, re-circulated slurry 18. The slurry at the bottom of the pond 21 can form a sedimentary layer of denser slurry and contain sand and clay. The traveling drain 23, without damaging the liner membrane, can scour the bottom of the pond with jets of reduced solid content digestate water and then suck in the disturbed bottom slurry. A gas draw pipe 1 and filter 7 made from porous PTFE (polytetrafluoroethylene) can be placed along the inner upper edge of the berm 22. The filter 7 can also be placed with floats out across the pond 21 to permit multiple gas gathering points in the pond. Low solid content digestate liquid piping 2 and spray nozzles or fans 27 are placed near the gas collection filters to enable the spray droplets 26 to break bubble foam 6,13 and push coatings off the PTFE filters 7. The recirculated slurry 26,27, and low solids water is delivered to and over the edge of the pond on the edge of the berm 22. A cover EPDM membrane is coated with a selective solar spectrum absorber and low emitter paint, coating, or surface treatment of the EPDM membrane 12. This membrane 12 is welded or bonded together to form a gas tight membrane that is sealed to the pond at the perimeter berm 22. Commercially available coatings 11 are Solkote® (Manufactured by Solec Solar Energy Corporation, 129 Walters Ave. Ewing, NJ 08638-1829) with an emissivity of 0.88-0.94 to the solar spectrum and 0.2-0.49 to below 100° C. thermal emission spectrum. Another commercially available paint is Thurmalox® 250 (manufactured by Dampney, Co. Inc., 85 Paris Street, Everett, MA 02149) with a emissivity of 0.96 for solar spectrum and emissivity of 0.52 bellow 100° C. thermal emissions. A network of weighting tubes and/or bladders 3,10,16 are placed across the pond and secured to the berm crest 22. At least one soft plastic or rubber coated tube 3,16 is placed out in the pond slurry liquid occupying area to hold the tubes to hold the tubes or bladders in a radial network shape. The rubber tubes or bladders 3,10,16 could be secured to the top cover membrane with glues or bonding. An alternative or complimentary placement of tube or bladder network could be place under the membrane cover to use buoyancy to lift and shape the cover membrane when inflated with gas. The tube networks can use density of tubes per unit area or variation in diameter of the tubes to create higher and lower per unit area deformations of ridges or valleys of the elastic cover membrane. This change in per unit area lift or depression of the cover membrane results in non-uniform distortion of the membrane cover and the slopes enable bubble flow under the cover membrane. One or more solar spectrum transparent cellular membranes 8 such as UV stabilized polyethylene bubble wrap (manufactured by Ameri-Brand Products Inc.

4619 Olive Hwy, Oroville, CA 95966) and/or PDVF (Polyvinylidene fluoride) and ETFE (Ethylene tetrafluoroethylene) membranes fluor ETFE membrane (manufactured by Agrotechnology & Food Innovations B.V. (A&F), P.O. Box 17, 6700 AA Wageningen, Netherlands) is placed over the cover membrane 12 and weighting network 16. These membranes are welded or bonded together form a gas tight continuous sheet over the top cover to the perimeter berm 22. At the perimeter berm 22 the stack of liner membrane, slurry pipes, water spray pipes, and cover membrane are sealed on the perimeter with a gasket such as neoprene foam 17. The seals accommodate the diameters the piping with shaped rubber gaskets. The stack of gaskets 17 are compressed with weighting clamps 4,14 that are placed around the perimeter berm of the pond. Weighting clamps 4,14 can be made of steel reinforced concrete blocks. The perimeter weighting clamp 4,14 can also include concrete filled recycled tires with a center shaft and enables the weights to be pried up and rolled. Weighting clamps can also be rubber bladders 4,14 filled with water that can be emptied when they need to be moved to gain access to the interior beneath the membranes 8,12. To operate the anaerobic solar digestor pond it is filled with a slurry of water, cattle manure, and bacteria cultures 21. The slurry of water cattle manure and bacteria culture is created by mixing the cattle manure from dairies and feedlots. Rocks and sand are removed and masticated and chopped to eliminate long fibers. Bacteria cultures are added with water and slurry 21 from an active culture from the ongoing anaerobic digestors. The low solid content water 2 from the centrifuge that has active bacteria cultures to make up a fraction of the needed water to make the slurry achieve between 6% and 12% solid content. Temperature of the slurry 21 is raised before injection into the pond by flowing through heat exchangers that exchange heat from heated water from a boiler and/or the solar pond weighting network. The slurry in the pond undergoes anaerobic digestion breaking down sugars, including cellulose, starches, proteins, and fats and converting them with bacteria water and deprived of oxygen to carbon dioxide hydrogen sulfide and methane gas. The resulting produced gas forms bubbles 24 in the slurry that rise in the slurry 24. These rising bubbles lift and push through the slurry liquid and by surface tension and flow drag can induce a flow pressure. This flow pressure can be converted to convective flow if a spontaneous convection cell is created or a preferential route for the convection cell is created. In the pond sloped surfaces of the membrane 12 can be created by weighting the cover membrane when it is made heavier in the center of the pond by filling a bladder 10 or with multiple tube concentration of weight per unit area in the center of the pond. The bubbles will collect on the underside of the cover membrane and travel upward along sloped surfaces 25. By weighting the pond cover to have a center dip 12 and radial dips in the cover the bubbles 25 will travel upward and away from the dips. This in turn will cause the bubbles to congregate and flow in the channels between the dips. These bubble flows 6,13,24,25 will induce pressure and resulting; looping flow from center to the cover membrane, radially along the underside of the cover membrane 25 between the dips 12, submerging at the edge of the pond, and flowing back to the center of the pond. At the edge of the pond 21 the cover membrane 25 goes above the liquid level and bubbles 6,13 emerge from the liquid. At this point the bubble emergence can form bubbles 6,13 and multiple bubbles of surfactants, proteins, lipids, that coalesce into foams. These foams 6,13 can coat the gas production gas/water separation filters. The hydrophobic porous PTFE coated gas intakes 7 separate gas and water, but may have difficulty remaining hydrophobic if surfactants or protein films coat the surface of the PTFE surface. Thus, ballistic water droplets 26 could provide enough kinetic energy to wash off surfactant and protein films off the Teflon surface 7. To reduce foaming sprays of droplets from low solid content water can puncture the bubbles 6 to reduce the foam volume. Sprays and re-circulation flow jets can be used to induce convection flow downward from the edges 5 of the pond toward the bottom of the pond 21. The operational system mode shown in FIG. 1 is with low pressure removal of biogas 5 from the gas cavity above the slurry. The water weighting tubes 3 are filled with water and deforming the cover membrane 12 into the slurry 21. This in turn displaces water up toward the edge of the pond 5 and toward the venting 1. The estimated vertical displacement of slurry 21 upward with low pressure gas collection 1 to counter the Bernoulli effect of 90 mph (145 km/hr) wind lift of 810 Pa is 8.2 cm (3.2 inches) of water. To withstand 180 mph (290 km/hr), the upper wind speed of most hurricane and tornados, the lower air pressure of 3,240 Pa and a displaced vertical height of water is 33 cm of slurry water 24. The biogas processing equipment can evacuate the gas pressure to these reduced pressures when high winds are predicted or detected quickly compared to weighting water tubes 10 to cover the surface of the pond with 8.2 cm of water to as much as 33 cm of water. These thicknesses of water cover would interfere with solar heat transfer into the cover membrane. Therefore, the majority of the surface of the cover membrane 11,12 should not have weighting tubes 3,10,16 or bladders on it to absorb sunlight and efficiently transfer it into the slurry. In daylight operation sunlight transmits through the cellular or membrane cover 8. In the mode shown in FIG. 1 the cellular membrane cover 8 to cover membrane cavity 9 is under a reduced atmospheric pressure to draw the membrane close to the cover membrane with a pipe to pump 15 and be able to resist wind induced lift off low pressures. The sunlight strikes the selective light absorbing surface 11 is absorbed and heats the cover membrane 12. The spectrally selective surface 11 has a low infrared emissivity such that it had a reduced radiant heat transfer to the cellular membrane cover 8. In this example shown in FIG. 1 where the membrane cover 12 and the cellular membrane cover 8 are in close proximity or in mechanical contact with each other, due to the low air pressure in the space 9 between them, the dominant heat transfer mechanisms will be by conduction between the layers 8,12 and through the stagnant air/gas in the cellular membrane 9. This configuration as shown in FIG. 1 is be the highest passive heat loss configuration for the pond and could be used to cool the pond slurry 21. This situation of needing to increase heat loss could occur with weather of high insolation and high air temperatures. Active heat removal can also be performed by flowing evaporatively chilled water through the weighting water tube network 3, 10,16 or cooling the input slurry 21 mix. Maintaining a constant average operational temperature in the pond 21 is needed to maintain an optimum anaerobic digestion environment in the pond. Therefore being able to adjust the thermal insulation to control the heat loss rates from the pond slurry will allow the compensation for variations in insolation, wind, and air temperature to maintain a steady average temperature with minimal combustion, electrical heating, evaporation, or refrigeration cooling. Solar ponds use the ground as a thermal reservoir such that the heat capacity of the earth and low heat transfer rates into the earth, compared to air and sky losses, acts as a temperature stabilizing mechanism of the pond. Adjustments of thermal insulation of the pond would be calculated and actuated to anticipate the effect of weather on weekly and monthly time scales.

Figure 2:
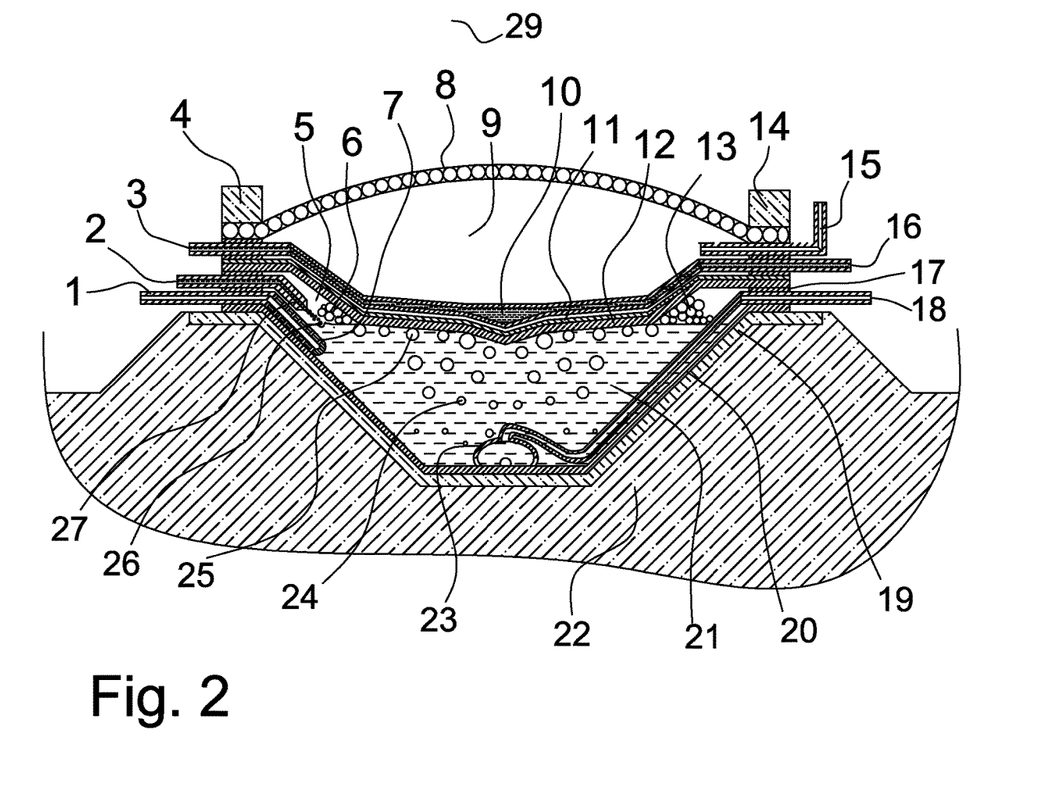
FIG. 2 is a cross-sectional view of covered solar digestion pond in negative pressure gas collection and positive pressure cellular membrane layer mode.

In FIG. 2 the solar pond is configured with the cellular membrane 8 to cover membrane 12 cavity pressurized with air or an inert gas, such as nitrogen or argon 9. While the cover membrane 12 to slurry liquid 21 gas cavity 5 is at a reduced atmospheric pressure and the weighting tubes 3, 10, 16 are filled with water 10. In this mode the sunlight is being received by the cover membrane coating 11 and heat is being transferred into the circulating slurry 21 by bubble drive convection 24, 25. The heat losses through radiation and conduction are minimized by inflating 9 the cellular membrane cover 8. The cellular membrane cover 8 could be several layers of membranes separated by several centimeters of stagnant air or inert gas 9. The amount of pressurization and subsequent distances between the layers of cellular or layers of the membranes 8 could be set such that it minimizes heat transfer rates. Large spaces 9 over several centimeters of stagnant air gaps between layers is found to be optimum in solar water heaters. The cellular membrane cover 11,12 could be made of low emissivity material or have a low emissivity coating such as aluminum oxide on its outer surfaces and inner surfaces to reduce radiant heater transfer while being able to transmit the shorter wavelength sunlight to the cover membrane selective absorption layer. With these selective low emissivity surfaces 11 on the cover membrane 12 and the cellular membrane 8 the radiant heat transfer can be reduced by the product of the emissivity between surfaces 8, 11.

Figure 3:
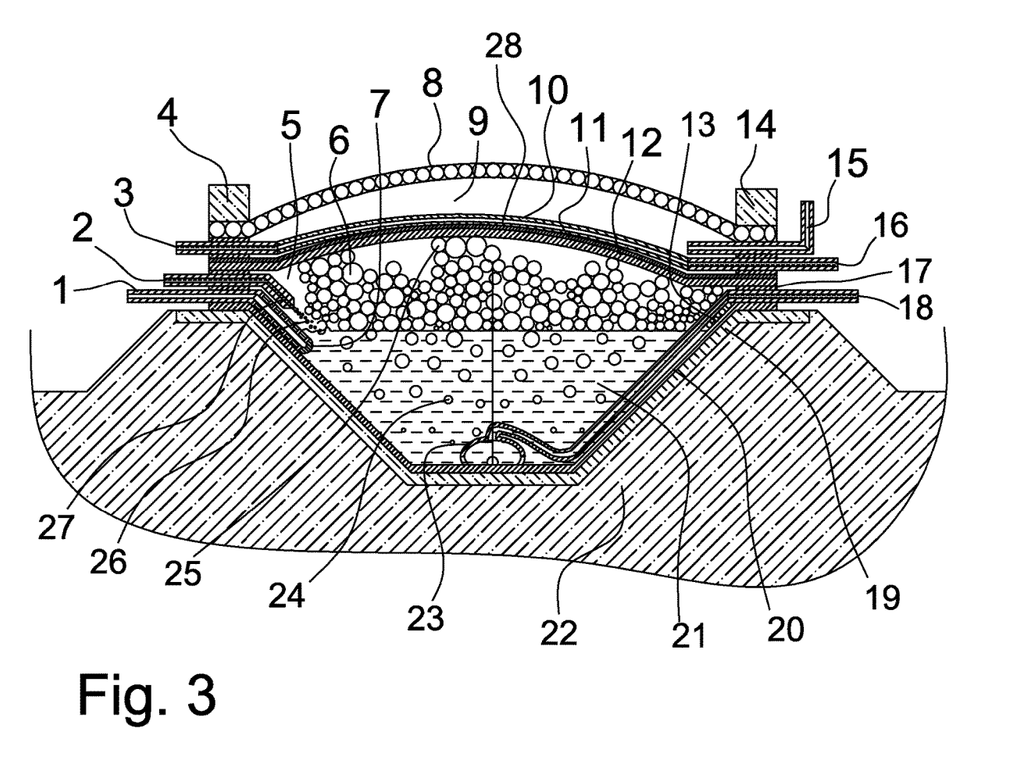
FIG. 3 is a cross-sectional view of covered solar digestion pond in positive pressure gas collection and positive pressure cellular membrane layer mode.

In FIG. 3 the solar pond is configured to have the cellular membrane cavity 9 to cover membrane 12 to slurry 21 the cavity 5,6,25 between the cover membrane and the liquid surface of the slurry increased. The weighting liquid water can be partially or fully removed and replaced with gas 28 from the network 3,10,16 and the biogas pressure allowed to rise. This is a mode in which the wind speeds are low, there is low insolation and there is a need to insulate the slurry to reduce conduction, convection, and heat loss to the atmosphere 29. From bio-gas bubbling 24 will form a foam 6, 25 on the surface of the slurry 21. This foam 6,25 acts as thermal insulation. The foam 6,25 forming can be enhanced by adding sugars, proteins, fats, acids, saponins, ligands, lipids, surfactants, and/or or gas bubbling to the digesting slurry. The timing and makeup of the additive can be metered in to provide a bubble foam with sufficient thickness and duration for the period of the need for thermal insulation. The additives chosen to digest, such as cheese whey waste, that is high in sugars and proteins to produce rapid production of bio-gas and robust foams and that can break down with anaerobic bacterial activity within 12 hours.

Figure 4:
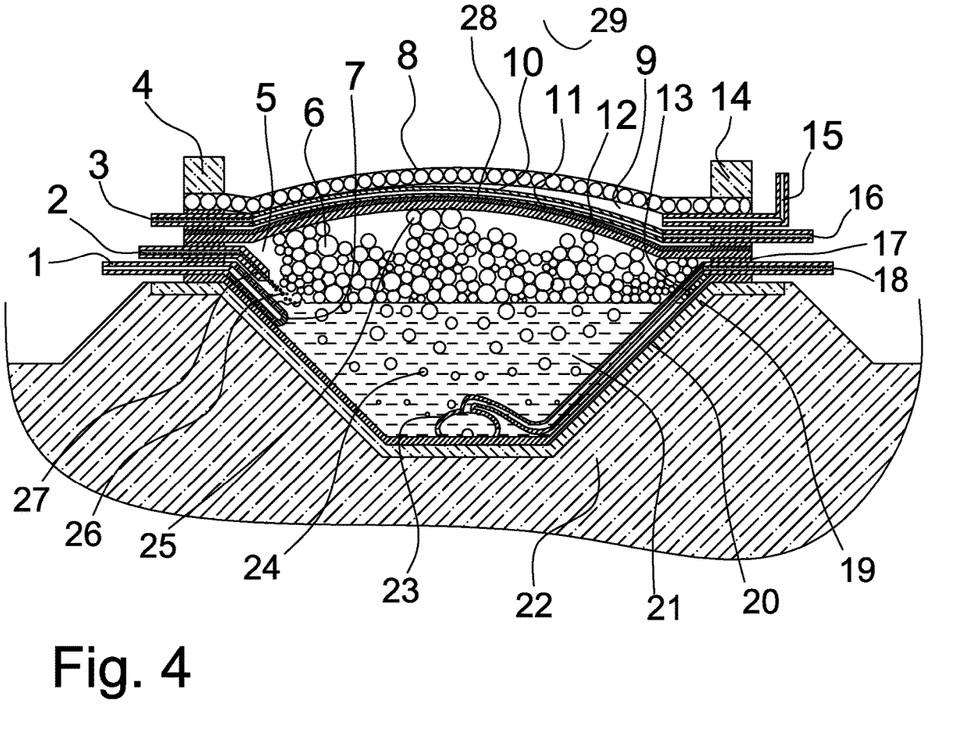
FIG. 4 is a cross-sectional view of covered solar digestion pond in positive pressure gas collection and negative pressure cellular membrane layer mode.

In FIG. 4 the configuration of reducing the gas cavity 9 between the cellular membrane cover 8 and the cover membrane 12. This configuration can be used increase the convection heat loss from the cover membrane 12 and reduce the wind lift-off of the cellular membrane 8. Gas or air is removed from the space 9 between the cellular membrane 8 and the cover membrane 12 through a pump or venting valve 15. Shown in FIG. 4 the weighting circulation tubes and bladders have the liquid water removed and replaced with gas 28. The gas pressure in the space 5 between the slurry and the cover membrane is above atmospheric pressure. Bubble foam 6, 25 from the anaerobic digestion bio-gas bubbling from the slurry anaerobic digestion is allowed to form an thermal insulating layer. Biogas 5 could be routed and pumped through the bottom drain 18 hose and drain 23 to increase the bubbling 24 and bubble foam 6, 25. The pumped biogas bubbling 24 could quickly increase the cavity 5 size between the slurry 21 and the cover membrane 12. This bubble foam 6, 25 insulating layer reduces heat loss from the slurry 21 but also reduces heat transfer from the cover membrane 8 to the slurry 21 when the cover membrane 12 is heated by sunlight. This configuration could be used to remove heat to the sky and atmosphere 29 from the ponds and/or reduce insolation energy gain. At night when there is no insolation from the sky 29 and continued need to remove heat from the slurry the system would be reconfigured as in FIG. 1 with the foam 6 removed and the cover membrane 12 in contact with the slurry 21. By being able to adjust the insolation heat gain and the convection heat loss from the slurry with the cover membrane 12 and the cellar layer 8 with pumping and valving fluids with electronic controls the influx and outflux of heat energy to the slurry can be adapted to weather conditions, slurry additions, or losses of slurry to maintain an average temperature of the slurry 21. By placing and recording temperature sensors on the slurry drain 23, cover membrane 12, weighting tube network 3,10,16, air temperature 29 and the cellular membrane 8 calculations of the heat fluxes can be done. By enabling electronic controls of pumps and valves, the operation can be computer controlled with coding to adjust the bubble layer thickness 6,25, cover membrane 11,12, weighting bladder 10 or tube fill 3,16, cover layer 12 position, and cellular layer 8 position. Computer modeling can use data from wind anemometers, humidity, precipitation gauges, and weather forecasts to anticipated heat influx or outflux. To budget the heat flows of the slurry pond to and from the pond 21 to the atmosphere and sky 29 and in a timed schedule adjusting the membrane layer positions 8,10,12, fluid fill 21, weighting bladder, tube fill 3,10,16, and bubble foam 6,25 production or reduction. Adaptive computer software can be utilized to effectively learn from past events to maintain an averaging operating temperature in the slurry pond 21.

Figure 5:
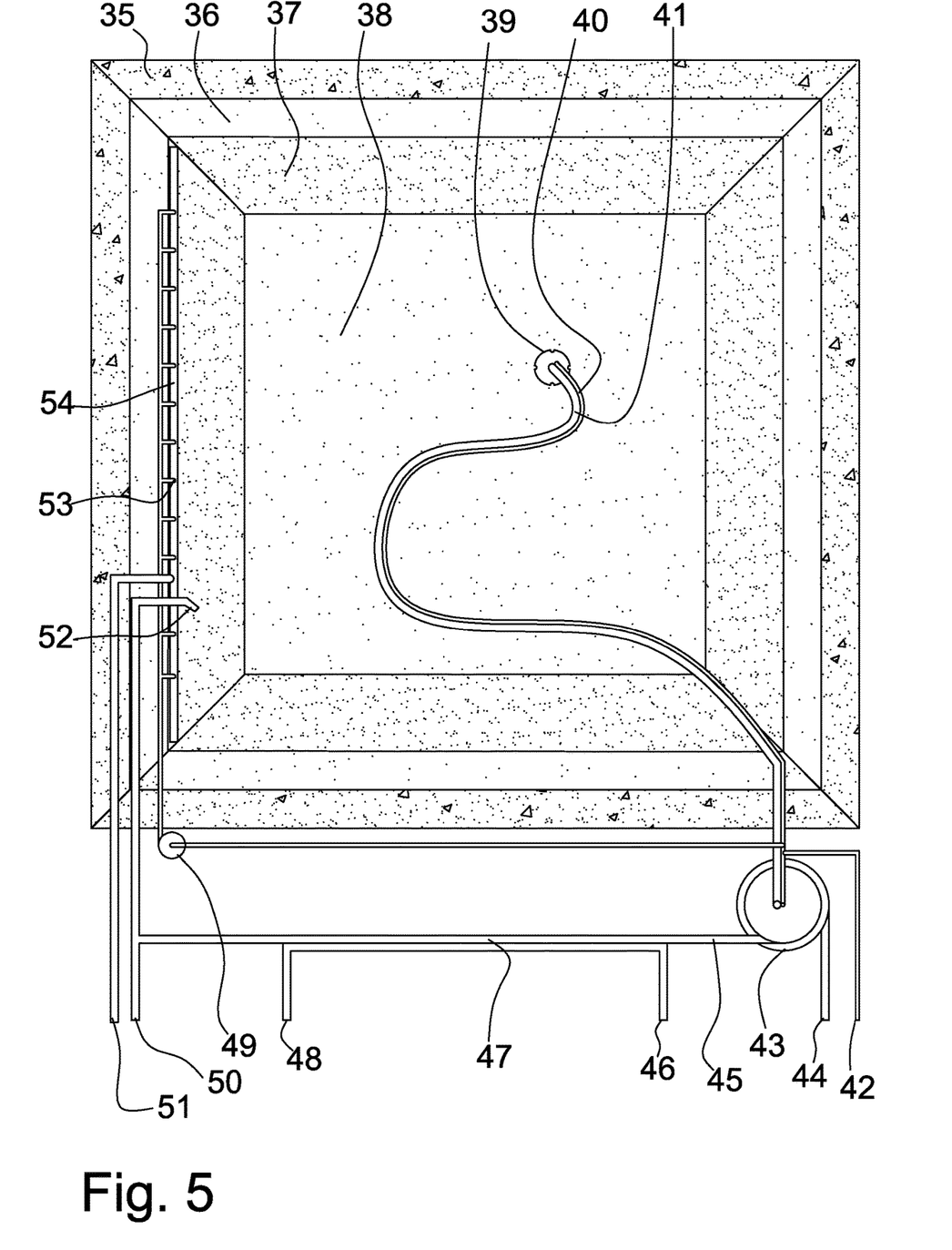
FIG. 5 is an aerial view of pond without cover showing liner.

FIG. 5 is an aerial view of the pond showing the liner membrane 38, traveling drain 39, gas outlet filter drain 54, low solid content water sprays 53, recirculation slurry input 52 and input slurry flow 50. The pond liner EPDM membrane 36,37,38 welded into a continuous membrane covering the depression 37,38 to the edge 36 of the berm 35. In the bottom of the depression 38 the traveling drain 39 with two flexible hoses 40,41 is shown. Two hoses 40,41 are used to flow low solid content high pressure water down to the drain entrance 39 to hydraulically actuate the traveling drain to move across the bottom surface 38 and with jets to disturb the bottom slurry and levitate the drain entrance above the liner membrane 38. The drain entrance 39 can have sensors that are attached to the flexible hose 40,41 and drain entrance 39. The electrical power to the drain 39 can drive pumps to perform diagnostics on the slurry and sensors such as the temperature, PH, and viscosity of the slurry. The drain 39 is connected through the flexible hose 40,41 to allow the traveling drain 39 to move and scour the bottom of the pond 38. The flexible drain hoses lay over the berm 36 and are connected to a centrifuge 43 and pump system 49 at the side of the pond. The centrifuge is used to separate un-digested solids and low solid content liquid. A portion of the slurry can be passed through without separation and recirculated 45,52 into the digestor pond. The recirculated slurry passes through a heat exchanger 46,47,48 to exchange heat with either hot or cold water. This enables heat additions and heat removals to the pond 38 from a water circulating boiler or chiller. The high solid content output of the centrifuge 43 is routed to bins and trucks 42. The low solids liquid digestate that comes out of the centrifuge 42,49 is routed to the sprayers 53, and liquid fertilizer output 44 to tanks or piped irrigation systems. Both the high solid content digestate 42 and low solid content digestate 44 is useable as agricultural fertilizer. On the edge of the berm 36 a pressure pump 49 can increase the water pressure of the low solids digestate liquid to spray jets 53 to knock down digestate foam. The jet nozzles 53 are arranged along the side of the berm 36,37. Underneath the spray jets are the porous hydrophobic filtered entrances to the gas collection network 54. The gas collection pipe 51 is shown going toward the gas separation and purification system. The recirculation slurry pipe 45 is shows with a tee intersection where new additions of slurry 50 to be digested can mix with the re-circulated digestate slurry and are jetted into the pond 38 through a directed nozzle 52.

Figure 6:
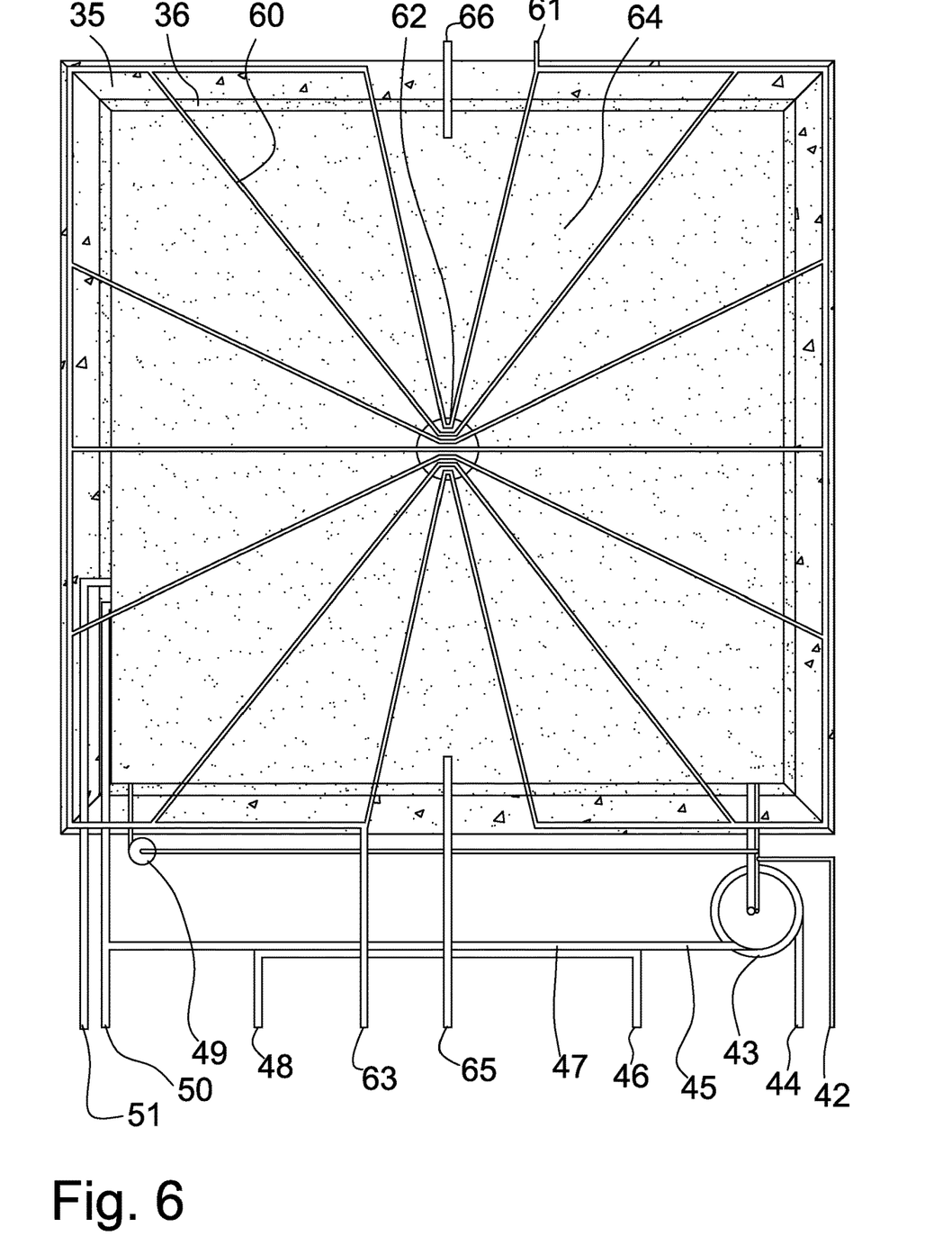
FIG. 6 is an aerial view of pond outer membrane cover surface with weighting flow tubes and bladder network.

In FIG. 6 the aerial view of the solar heated digestor pond is shown with the top cover 64 placed over the liner and on the perimeter seal 36. The cover membrane 64 has a selective light absorption coating or it is incorporated into the on the top surface of the membrane 64. The input and output piping goes through the perimeter seal 36. A network of weighting flexible water tubes 60 are shown at an interconnected web of hoses that cross over and rest on the pond cover membrane 64. Each tube crosses over to and from the central hub 62 to enable the tube network 60,61,63 to effectively be a net that is secured at the edge of the pond 35. These tubes can be made from EPDM rubber or elastic materials to be mechanically and chemically compatible with the EPDM rubber cover membrane 64. The weighting tubes 60 can be bonded to the cover membrane 64 to increase heat transfer and avoid friction wear between the tubes and membrane. In the center of the network a central mechanical holding block of the hoses 62 can also be a bladder that can be filled with the water to increase weighting pressure on the central region of the cover membrane. The weighting tube network 60 could be filled with water from the heat exchange water system 46,47,48. Input 48 and output tubes 46 in the counter flow heat exchanger are shown. The weighting tube network 60 can also act as heat collection and transfer system from the pond 64 to other heat or cooling systems by circulating water through the tube network. It is located on the top cover that will have the insolation and radiant heat loss coming from this surface so it is also is a strategic location to add or remove heat to the thermal mass of the slurry pond without going into the slurry itself. In addition, the weighting tube network 60 can have an electrical sensor network attached to it to measure temperatures, gas content, membrane position, and pressures. To enable, along with air sensors and sensors within the slurry, to monitor heat flux, gas leakages, and membrane position and shape to ascertain the foam bubble layer thickness and shape under the cover membrane.

Figure 7:
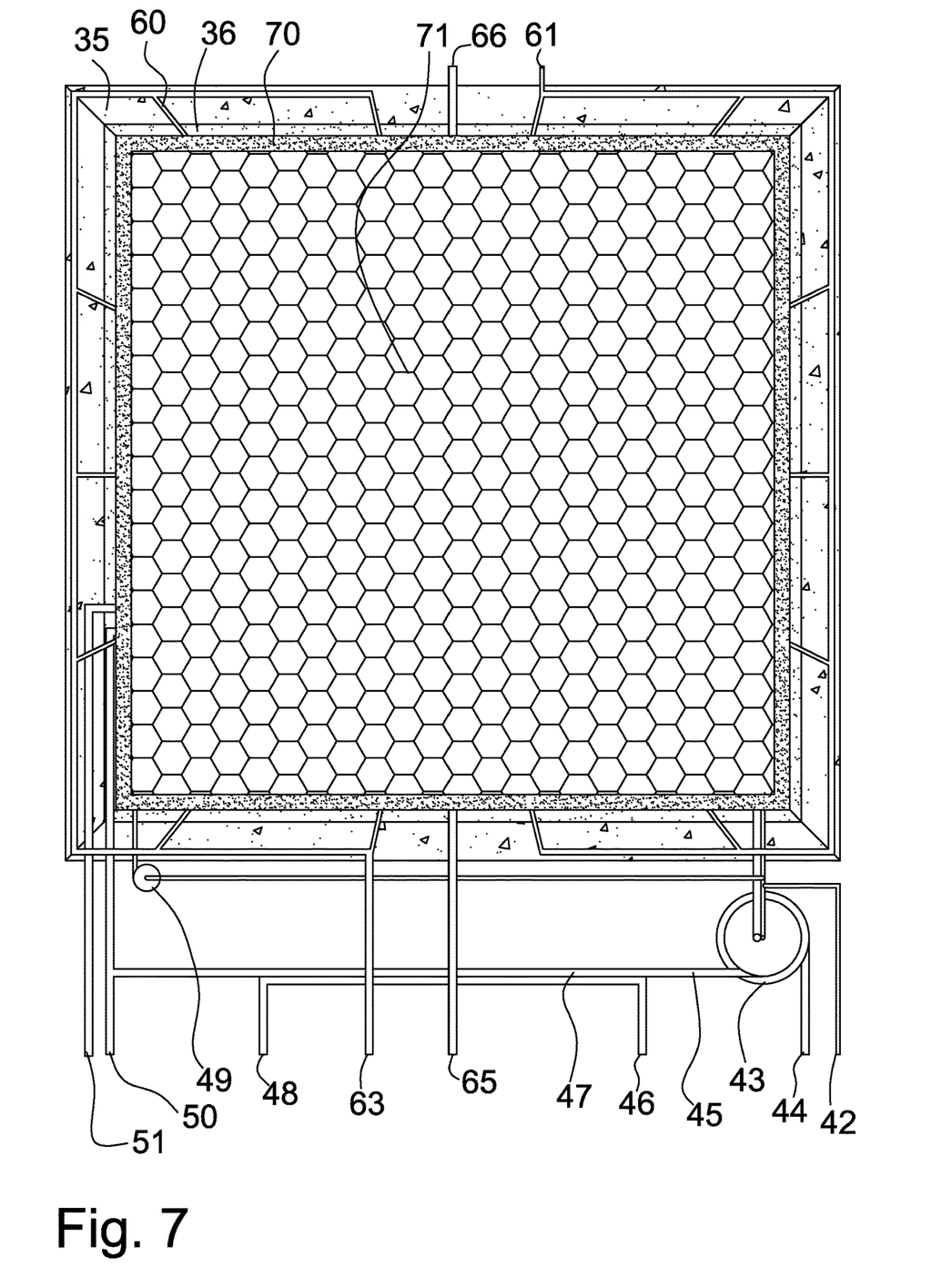
FIG. 7 is an aerial view of pond with cellular membrane cover in place.

In FIG. 7 the cellular membrane cover 71 made from UV stabilized polyethylene is placed over the weighting tube network 60,61,63 and the clamping weights 70 are secured at the perimeter 36 and pressing on the perimeter seal 36. The perimeter seal 36 can be made of closed cell neoprene rubber and rubber sealants that allow for a repeatable opening and sealing. The weighting tube network 60 and electrical sensor seals and cellular membrane gas inflation tubing 65,66 is sealed with the perimeter seal 36 between the cellular membrane 71 and the cover membrane.

Figure 8:
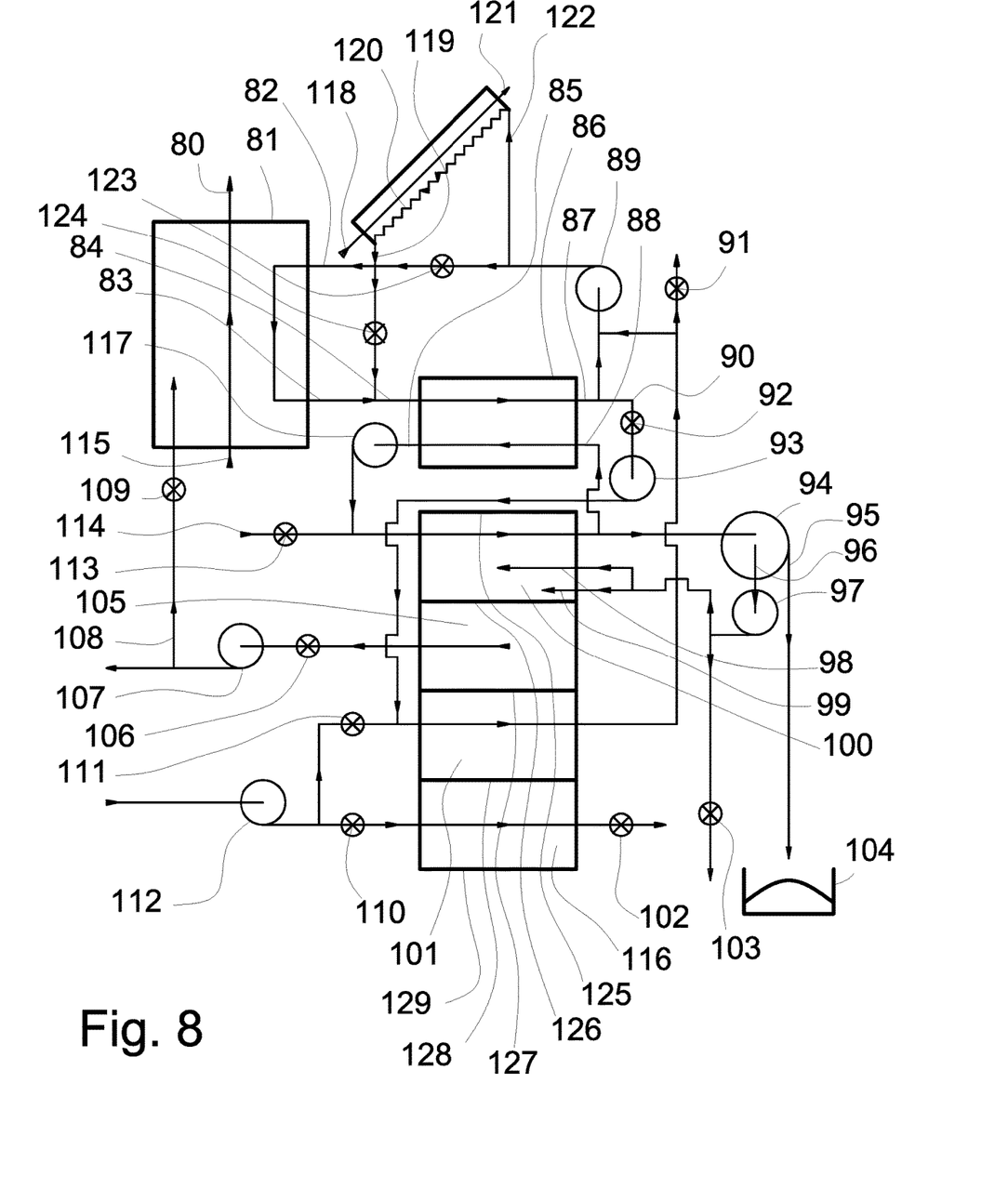
FIG. 8 is a flow control system schematic.

In FIG. 8 the material flow system of the solar pond 100,105,116 is shown schematically. This schematic is a simplified essential diagram of the flow routes. In practice a variety of additional routes and components may be used, such as valves, before and after long sections of pipe and before equipment and heat exchangers 86 to allow servicing. Periodic pipe clean-outs in the slurry pipes 85,88. Bypass routes and the hot and cold-water flows may run in separate pipelines and service each heat exchanger 86 through valved connections. The source of active anaerobic slurry mix 114 and added chemicals and bubble enhancing materials are not shown. Gas purification equipment is not shown. The boiler system is shown with bio-gas input 108,109 from the gas compressor 107. The gas consumed could alternatively come from the purified pipeline gas. The gas is combusted with air 115 and heat is transferred from the combustion exhaust 80 into the water heat circulation system 82,83,84, 87,89,90,91,92,93,101. Alternatively, the heating of water could come from a solar water heating system. A cold-water loop 84,87,89,119,120,122,124 from an evaporatively and/ or refrigeration chilled water system 118,120,121 could also run through a heating cooling heat transfer loop 82,83, 84,87,89 123 to the pond heating and cooling heat exchanger surfaces 85,88. Heated boiler water or chilled water flowing through a heat exchanger 86 will heat or cool, as needed, the recirculated slurry loop 85,88,117 and/or new input slurry 113,114. A portion of the slurry flow 88,85 can go to the centrifuge 94 that can separate liquids 96 and solids 95. Concentrated solid digestate 95 will output from the centrifuge to a truck or bin 104. Low solids liquid 96 from the centrifuge will be pumped 97 to the fertilizer delivery tanker trucks or pipelines 103, the traveling bottom drain 98, and/or the foam 100 knock down spray nozzles 99. A pressurized gas system 91,101,102,110,111,112 of nitrogen or air can be used to inflate the space 116 between the cellular membrane and the weighting tube network 101, 128 and the cover membrane 127. The pump 112 could be reversed or the valve 102 could also be a vacuum pump, to lower the pressure in the space 116 between the cellular plastic membrane cover. This gas supply 91,101,102,110,111,112 can also be used to purge the weighting tubes 101 of liquid water. A vent valve 91 is shown that can release purge gas. Liquid water 87,90,92,93 from the boiler system can be flow into the weighting tube network 101. This liquid water 101 could be circulated to and from the boiler 81 to heat or cool the cover membrane 126 of the pond in contact with the digesting slurry 100. Though the bubble pumping circulation of the slurry the top surface heating heats the bottom of the slurry pond liner membrane 125. The weighting tube network 101 can also be used to collect heat into the heating/cooling circulated water loop 82,83,87,89,119,120,122,123, and used to provide heat to the initial slurry mix 114,113 to reach digestion temperature and maintain the digestion temperature in other sun shaded bio-reactors. Bio-gas from the gas space between the slurry 105 and the cover membrane is collected with a compressor 106,107 that can vary it's speed, such as with a three phase motor with a variable frequency drive, and a with a pressure sensor connected to the gas volume 105 above the slurry. This enables control of the pressure and of the gas volume 105 and the contact between the slurry 100 and the cover membrane 127. In operation the inert gas pressurization system 91,102,110,111,112 can be used to purge the weighting water tube network 101 and also to inflate or evacuate the gas cavity 116 between the cellular membrane 129 and the weighting water network 128 and the cover membrane 127.

While the invention has been described with reference to specific embodiments, modifications and variations of the invention may be constructed without departing from the scope of the invention described in the claims.

INVENTION COMPONENTS

1. Covered pond with gas impermeable layer flexible gas collection and light absorption cover
2. Anaerobic digestion occurring in a slurry contained within a pond with bottom and top polymer rubber layers.
3. Gas forming and bubbling digestion in slurry
4. Multiple slurry circulation modes
5. Anchoring and sealing on perimeter of membranes and berm
6. Pipe and sensor access and seals at perimeter of membranes and berm
7. Sloped cover membrane surface in contact with liquid slurry to use bubble rise to propel fluid flow
8. Shape change of cover membranes to affect a change in circulation
9. Shape change of cover membranes to affect change in heat transfer from cover membranes to slurry or to sky
10. Shape change of cover membranes affected by raising or lowering pressure under the membranes with relative to the above air pressure.
11. Selective light absorber and low emissivity layer
12. Light transmitting Insulation layer
13. Gas and liquid Impermeable top layer
14. Gas and liquid Impermeable bottom layer
15. Clay layer under bottom layer
16. Digestate input flow pipe
17. Output flow digestate pipe mobile and flexible tubing
18. Output flow digestate pipe with vertical rise to fluidize sediment intake
19. Bio-gas (Methane+Carbon dioxide) gas flow routes
20. Separation of digestate and gas
21. Liquid/gas Filters within pond
22. Bubble breaking jets
23. Side gas cavities and liquid gas accommodation region
24. Bubbling producing digestion process that induces slurry flow
25. Bubbling digestion producing process that with surface membrane shapes can induce convection flow patterns.
26. Surface membrane shapes created by non-uniform weighting creates flow channels for bubble flow and gas and induce convection flow patterns.
27. Surface membrane shapes that create non-uniform weighting that channel bubble flow such that it to allow for sufficient bubble flow removal to allow liquid contact with the membrane to transfer heat to the slurry.
28. Shape change of membranes to affect a gas space above the slurry and allow a bubble surface foam above the slurry surface to thermally insulate the slurry surface to the membrane cover
29. Input pump
30. Output pump
31. Circulation pump
32. Hovering pond bottom drain on tube
33. Hovering pond bottom drain tube with vertical flow to fluidize slurry
34. Water jets in bottom drain to fluidize slurry
35. Weighting and heat transfer fluid water) tubes on gas cover.
36. Anchoring weighting tubes to and anchored at perimeter
37. Pressurization and vacuum capability of digestate gas collection
38. Pressurization and vacuum capability to spaces between membranes.
39. Leak detection capability of the digestate gas collection
40. Leak detection capability in the insulation layer
41. Sensors for windspeed, relative humidity and air temperature
42. Use weather predictions to make anticipatory adjusts of the shape of membranes and modes of operation of digestion pond for high winds, lower temperature, low or high insolation.
43. Heating and cooling heat exchangers While the invention has been described with reference to specific embodiments, modifications and variations of the invention may be constructed without departing from the scope of the invention, which is defined in the following claims.

I claim:

1. Apparatus comprising a membrane covered anaerobic digestor pond containing digesting slurry kept at a temperature different and more constant than an ambient air temperature with a polymer membrane liner a depression in the earth with a polymer membrane cover that absorbs sunlight, wherein a circulation of contained digesting slurry within a volume between the polymer membrane liner and the polymer membrane cover that is in contact with digesting slurry and the polymer cover membrane can actuate to be a sloped contact with the digesting slurry by raising or lowering the pressure of a space between the membrane cover and the membrane liner and/or by changing a weight or buoyancy of tubes with additions or removal of fluids from tubes or bladders in contact with the membrane cover that product gas bubbles rise under a sloped membrane cover propels fluid circulation of digesting slurry liquid and therein transfers heat by convection between the membrane cover and the digesting slurry liquid and collection of gas from digesting slurry.

2. The apparatus of claim 1, further comprising a polymer membrane interface that by sub atmospheric pressure and/or fluid in weighting tubes or bladders in contact with the polymer membrane cover deform the polymer membrane cover when the tubes or bladders are filled or emptied, the circulation of fluid transfers heat by liquid convection between the membrane cover to the digesting slurry when the tubes or bladders have liquid in them, or reducing gas pressure, and to reduce heat transfer from digesting slurry to the membrane cover by removing liquid in tubes or bladders or reducing gas pressure below the membrane cover, and means to fill the pond, circulate, and empty the pond of slurry through pipes that access the volume between the polymer membrane liner and the polymer membrane cover.

3. The apparatus of claim 1, wherein the polymer membrane cover is coated or made of a material that possesses a higher normal total absorptivity for solar radiation than its normal total emissivity in the temperature range of −74° C. to 200° C.

4. The apparatus of claim 1, wherein bubble foam forms and reduces heat transfer between the membrane cover and the digestate slurry interface when a collected gas pressure is raised and/or the liquid in bladders and/or tubes is removed sufficiently to create a cavity that hold bubbles between the surface of digestate slurry and membrane cover and remove slope surface contact between the polymer membrane cover and liquid slurry.

5. The apparatus of claim 1, wherein the bubble foam creation is stimulated by timed and metered injection of chemicals, nutrients, or gas to create foam with a biological digestion process to increase thermal insulation to retain heat in the pond and the biological digestion process also breaks down the chemicals or nutrients to remove the stimulation of bubble foam when insulation needs is removed to enable heat contact transfer from slurry liquid contact with a solar insolation heated membrane cover.

6. The apparatus of claim 1, wherein a visible light transparent cover with air cells is placed above the polymer membrane cover and n air space between the transparent cover can be made sub-atmospheric pressure or fluid weighting the transparent cover to secure the transparent cover from wind lift-off and/or increase heat flow to atmosphere from the pond.

7. The apparatus of claim 1, wherein a visible light transparent cover with air cells is placed above the polymer membrane cover, and an air space between the transparent cover can be made above atmospheric pressure or fluid removal the transparent cover to decrease heat transfer from the polymer membrane cover and the transparent cover.

8. The apparatus of claim 7, wherein the transparent cover is coated with material that has a lower total emissivity in the temperature range of −74° C. to 200° C. than its normal total transmittance of solar radiation.

9. The apparatus of claim 1, wherein porous hydrophobic tubes are placed between the membrane liner and the membrane cover to filter gas from liquid water and digestate slurry and collect gas.

10. The apparatus of claim 2, wherein the weighting tubes carry water and are used to remove or add heat by conduction to the membrane cover.

11. The apparatus of claim 2, wherein the weighting tubes or bladders are placed under the polymer membrane cover and adapted to be filled with gas and less dense than slurry fluid, and by buoyancy deform the polymer membrane cover to create sloped polymer membrane cover to slurry contact slope.

12. The apparatus of claim 9, wherein the porous hydrophobic tubes are buoyant in the slurry and create a slope at point of contact between the polymer membrane cover and the slurry.

13. The apparatus of claim 1, wherein foaming in the anaerobic digestion foaming can be enhanced by adding sugar, protein, enzymes, acids, or fats to the slurry to place a foam layer between the cover and the digesting liquid surface enhances foam production and strength to coincide with decreased ambient temperature to reduce heat transfer from a slurry surface and the membrane cover.

14. The apparatus of claim 1, adding sugar, protein, enzymes, acids, or fats to accelerate anaerobic digestion, generate heat, or shift pH of the slurry.

15. The apparatus of claim 13, adding material to reduce the foaming when desired to transfer heat from the polymer membrane cover to slurry liquid by convection contact.

16. The apparatus of claim 1, wherein a drain hose is placed on the liner inside the slurry and the drain hose has an entrance that has outgoing fluid flows and ingoing fluid flows that can propel the slurry to disturb and suction sediments on a surface of the liner.

17. The apparatus of claim 16, wherein the drain entrance has a vertical rise to fluidize the slurry from a bottom of the pond.

18. The apparatus of claim 1, wherein a gas drain placed between a surface of the slurry liquid and under the cover and jets of liquid preceding an entrance break foam bubbles.

19. The apparatus of claim 1, wherein a gas drain is placed between a surface of the slurry liquid and under the membrane cover, and jets of liquid preceding an entrance of the gas drain break foam bubbles, and the liquid flow in the jets is derived from slurry.

20. The apparatus of claim 2, wherein the weighting tubes or buoyant tubes in contact with the polymer membrane cover are secured and sealed between the polymer membrane cover and the pond liner at a perimeter of the pond.

21. The apparatus of claim 1, wherein the membrane cover is light transparent, and input and output fluid tubing are sealed at a perimeter of the pond.

22. A method comprising:
providing an excavated depression, building a berm around the depression,
lining the depression and an inside of the berm with an impermeable material, providing a digesting slurry within the lined depression,
covering the slurry with a weighted membrane, controlling and collecting gas generated by the slurry,
raising the membrane with trapped gas when the membrane is colder than the slurry, resting the membrane on the slurry when the membrane is warmer than the slurry, and transferring solar heat by conduction from the membrane to the slurry.

23. The method of claim 22, wherein the membrane has fluid conduits for weighting and unweighting the membrane.

24. The method of claim 22, wherein the membrane is weighted for contacting the slurry during periods of wind sufficient to lift the membrane.

25. The method of claim 22, further comprising evacuating gas from the slurry during periods of wind sufficient to lift the membrane.

26. The method of claim 22, further comprising removing slurry from a bottom of the lined depression or pumping gas into the bottom of the slurry through a tube leading from a bottom of the depression to an outside of the berm.

\* \* \* \* \*